(12) United States Patent
Bodine et al.

(10) Patent No.: US 11,622,665 B2
(45) Date of Patent: *Apr. 11, 2023

(54) HOUSEHOLD APPLIANCE CLOSURE ELEMENT WITH TOUCH INTERFACE

(71) Applicant: WHIRLPOOL CORPORATION

(72) Inventors: Darryl C. Bodine, Saint Joseph, MI (US); Randell L. Jeffery, Stevensville, MI (US); Eric Schuh, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 103 days.

This patent is subject to a terminal disclaimer.

(21) Appl. No.: 17/126,288

(22) Filed: Dec. 18, 2020

(65) Prior Publication Data

US 2021/0103355 A1    Apr. 8, 2021

Related U.S. Application Data

(62) Division of application No. 15/210,458, filed on Jul. 14, 2016, now Pat. No. 10,908,762.
(Continued)

(51) Int. Cl.
*A47L 15/00* (2006.01)
*A47L 15/42* (2006.01)
(Continued)

(52) U.S. Cl.
CPC ....... *A47L 15/0084* (2013.01); *A47L 15/4293* (2013.01); *D06F 34/32* (2020.02);
(Continued)

(58) Field of Classification Search
CPC .. A47L 15/0084; A47L 15/4293; D06F 34/32; D06F 23/04; D06F 2101/00;
(Continued)

(56) References Cited

U.S. PATENT DOCUMENTS 5,655,394 A    8/1997  Dirocco, Jr.
5,720,054 A    2/1998  Nakayama et al.
(Continued)

FOREIGN PATENT DOCUMENTS

EP    0774626 A2    5/1997
EP    1970631 A2    9/2008
(Continued)

*Primary Examiner* — Bitew A Dinke
(74) *Attorney, Agent, or Firm* — McGarry Bair PC (57) ABSTRACT

A household appliance includes a housing; a treating chamber located within the housing and having an access opening; a closure element movable relative to the access opening between opened and closed positions to selectively provide access to the treating chamber through the access opening; a controller associated with the housing and implementing a treating cycle on at least one item in the treating chamber; and a human-machine interface. The HMI includes a first portion associated with the housing and a second portion associated with the closure element. The first portion includes non-touch sensitive indicia. The second portion includes an electrically conductive layer having a touch-sensitive area corresponding to the indicia of the first portion and is arranged to be in register with a corresponding selection area when the closure element is in the closed position.

20 Claims, 7 Drawing Sheets

Related U.S. Application Data (60) Provisional application No. 62/194,313, filed on Jul. 20, 2015.

(51) Int. Cl.
  *G06F 3/041* (2006.01)
  *G06F 3/0481* (2022.01)
  *D06F 34/32* (2020.01)
  D06F 23/04 (2006.01)
  D06F 105/58 (2020.01)
  D06F 101/00 (2020.01)

(52) U.S. Cl.
  CPC ............ *G06F 3/041* (2013.01); *G06F 3/0416* (2013.01); *G06F 3/0481* (2013.01); D06F 23/04 (2013.01); D06F 2101/00 (2020.02); D06F 2105/58 (2020.02)

(58) Field of Classification Search
  CPC .... D06F 2105/58; G06F 3/041; G06F 3/0416; G06F 3/0481
  See application file for complete search history.

(56) References Cited

U.S. PATENT DOCUMENTS

| | | | |
|---|---|---|---|
| 5,771,717 A | 6/1998 | Broker et al. | |
| 6,300,609 B1 | 10/2001 | Kim | |
| 6,747,399 B1 | 6/2004 | Ogino et al. | |
| 7,348,527 B2 | 3/2008 | Braunisch et al. | |
| 8,310,839 B2 | 11/2012 | Arione et al. | |
| 8,723,934 B2 | 5/2014 | Kappler et al. | |
| 10,908,762 B2* | 2/2021 | Bodine | A47L 15/0084 |
| 2002/0153370 A1 | 10/2002 | Stutman | |
| 2003/0131620 A1 | 7/2003 | Sanna | |
| 2004/0144138 A1 | 7/2004 | Takeuchi et al. | |
| 2004/0240196 A1* | 12/2004 | Wilsdorf | H03K 17/962 362/89 |
| 2004/0250565 A1 | 12/2004 | Lee et al. | |
| 2005/0011511 A1* | 1/2005 | Lappat | F24C 15/008 126/213 |
| 2007/0022522 A1 | 2/2007 | Yu | |
| 2007/0086151 A1 | 4/2007 | Oh et al. | |
| 2007/0180869 A1 | 8/2007 | Geyer | |
| 2008/0105248 A1 | 5/2008 | Lee et al. | |
| 2008/0190467 A1 | 8/2008 | Maunsell et al. | |
| 2008/0236563 A1* | 10/2008 | Wilsdorf | F24C 15/02 126/273 R |
| 2008/0276203 A1 | 11/2008 | Santinato et al. | |
| 2009/0039068 A1 | 2/2009 | Boutwell | |
| 2009/0044846 A1 | 2/2009 | Rosenbauer et al. | |
| 2009/0118848 A1 | 5/2009 | Santinato et al. | |
| 2009/0121970 A1 | 5/2009 | Ozbek | |
| 2009/0216099 A1 | 8/2009 | Kim | |
| 2010/0157511 A1 | 6/2010 | Knight et al. | |
| 2011/0085287 A1 | 4/2011 | Ebrom et al. | |
| 2012/0036900 A1* | 2/2012 | Hong | D06F 34/32 68/139 |
| 2012/0327201 A1* | 12/2012 | Kappler | D06F 34/32 312/228 |
| 2013/0099715 A1 | 4/2013 | Fuhge | |
| 2013/0125937 A1 | 5/2013 | Baldwin et al. | |
| 2014/0157673 A1 | 6/2014 | Bazzinotti | |
| 2014/0210793 A1 | 7/2014 | Eriksson et al. | |
| 2015/0005943 A1 | 1/2015 | Bodine et al. | |
| 2015/0019017 A1* | 1/2015 | Bodine | D06F 33/30 700/275 |
| 2015/0097691 A1 | 4/2015 | Smith | |
| 2015/0157184 A1 | 6/2015 | Alexander | |
| 2015/0330008 A1* | 11/2015 | Yang | G05B 15/02 700/275 |
| 2015/0345065 A1* | 12/2015 | Yang | G05B 15/02 700/275 |
| 2016/0076777 A1 | 3/2016 | Wait | |
| 2016/0116171 A1 | 4/2016 | Johnson et al. | |
| 2016/0201251 A1* | 7/2016 | Zhang | D06F 39/14 700/275 |
| 2016/0220170 A1* | 8/2016 | Hasegawa | A61B 5/6891 |
| 2016/0374619 A1 | 12/2016 | Borkholder et al. | |
| 2017/0211816 A1 | 7/2017 | Luckhardt et al. | |
| 2017/0241066 A1* | 8/2017 | Caspers | G08B 21/24 |
| 2017/0328577 A1* | 11/2017 | Reinhard-Herrscher | E05B 17/10 |
| 2018/0002853 A1 | 1/2018 | Anand et al. | |
| 2018/0054089 A1 | 2/2018 | Lee et al. | |
| 2018/0209087 A1 | 7/2018 | Anand et al. | |
| 2018/0216381 A1 | 8/2018 | Lee et al. | |
| 2018/0274155 A1 | 9/2018 | Anand et al. | |

FOREIGN PATENT DOCUMENTS

| | | |
|---|---|---|
| EP | 1891499 B1 | 9/2011 |
| GB | 2216649 A | 10/1989 |
| JP | 2002228160 A | 8/2002 |
| WO | 2002065036 A1 | 8/2002 |
| WO | 2012172016 A1 | 12/2012 |

* cited by examiner

HOUSEHOLD APPLIANCE CLOSURE ELEMENT WITH TOUCH INTERFACE

CROSS REFERENCE TO RELATED APPLICATIONS

The present application claims the benefit of and is a divisional of U.S. patent application Ser. No. 15/210,458, filed Jul. 14, 2016, now U.S. Pat. No. 10,908,762, issued Feb. 2, 2021, which application claims the benefit of U.S. Provisional Patent Application No. 62/194,313, filed Jul. 20, 2015, all of which are incorporated herein by reference in their entirety.

BACKGROUND

Household appliances, examples of which include a clothes washer, clothes dryer, an oven, a microwave, a refrigerator, a dishwasher, etc., perform useful cycles of operation and often have electrical and mechanical components responsible for implementing the cycle of operation of the appliance, with one or more of the components controlling the operation of the other components. For example, a controller, such as a microprocessor-based controller, having a printed circuit board (PCB) with memory, can control the operation of the various components to implement a cycle of operation.

A human-machine interface (HMI) can be provided as part of or separate from the controller to provide input and output communication between a user of the household appliance and the controller. The HMI can include one or more knobs, dials, switches, displays, touch screens, and the like for communicating with the user, such as to receive input and provide output. The user can enter different types of information to affect the cycle of operation. An HMI can include touch sensitive elements provided on an outer surface of the household appliance.

BRIEF DESCRIPTION

An aspect of the present disclosure relates to a method of operating a human-machine interface (HMI) of a household appliance includes controllably displaying non-touch sensitive display elements on a first portion of a housing having a treating chamber, wherein the display elements are overlain with a second portion of a closure element movable relative to the first portion of the housing between open and closed positions, the second portion including an electrically conductive layer having a touch-sensitive area corresponding to the display elements.

DETAILED DESCRIPTION

When the HMI is located near or on an appliance closure element such as a door or a lid, a user can inadvertently activate a touch sensitive element located on or near the closure element, such as by leaning against the appliance or during placement or removal of a consumer article into or out of an interior treating chamber of the appliance. Additionally, the electrical components needed for display elements of an HMI impose limitations with respect to the form factor and aesthetics of the overall HMI, particularly when the HMI is disposed on the closure element.

Figure 1:
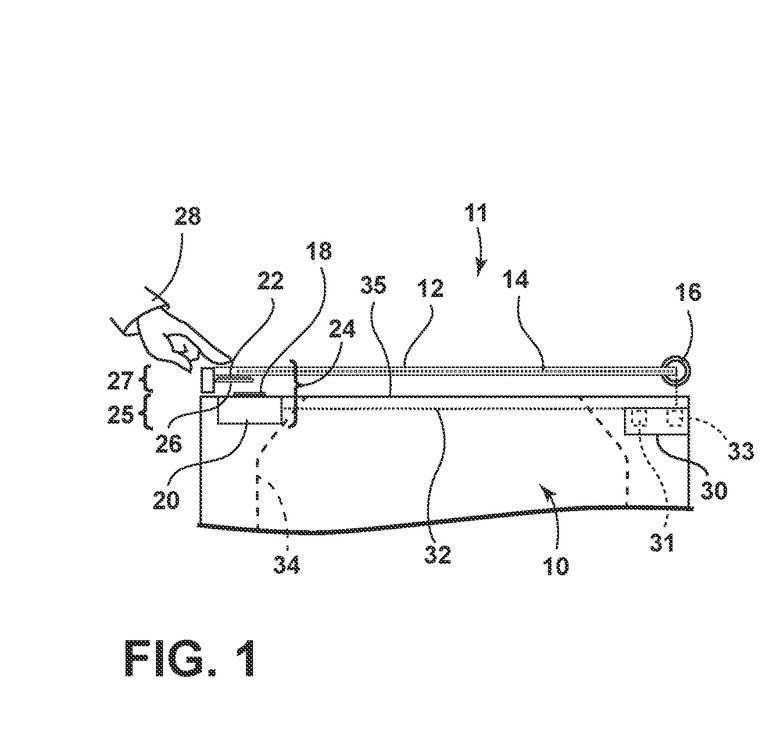
FIG. 1 shows a partial side view of a household appliance with a movable closure element in a closed position.

FIG. 1 shows a partial side view of a household appliance 11 with a movable closure element 12 in a closed position. The household appliance 11 includes a housing 10, a movable closure element 12, a controller 30 and an HMI 24.

The housing 10 includes at least one access opening 35 to the interior of the housing 10. The interior of the housing 10 can define a treating chamber 34 into which a user 28 can place one or more consumer articles. The housing 10 can be any structure for enclosing, supporting and protecting the electrical and mechanical components of the household appliance 11 including, but not limited to a cabinet and a frame. The housing 10 can be formed of any material suitable for construction of the housing structure including, but not limited to metal, plastic, composite materials and combinations thereof. Some models of household appliances can include decorative panels that can be mounted on the housing 10.

The movable closure element 12 is a cover that selectively provides access to the treating chamber 34 through the access opening 35. The movable closure element 12 can be formed into any suitable cover to provide selective access to the treating chamber 34 by moving between opened (shown in FIG. 2) and closed positions, including but not limited to, a lid, a door, a drawer, a removable panel, etc. The motion that moves the closure element 12 can be any motion capable of toggling the closure element 12 between the opened and closed positions and includes but is not limited to swinging, pivoting, sliding, and rotating. For example, as shown in FIG. 1, the movable closure element 12 is a lid that is coupled to the housing 10 by a lid hinge 16.

The movable closure element 12 can be transparent. It will be understood that "transparent" as applied to the movable closure element 12 and used herein not only implies that light can pass through the movable closure element 12 so that objects on one side of the movable closure element 12 can be distinctly seen on the other side but can also include semitransparent materials that are partially or imperfectly transparent as well as transparent regions that include semi-transparent or opaque graphics. The movable closure element 12 can be formed from any suitable material for transparency including but not limited to glass, plastic, vinyl and combinations thereof.

The HMI 24 includes a first portion 25 associated with the housing 10 and a second portion 27 associated with the closure element 12. The first portion 25 includes the display elements that provide output from the HMI 24 to a user. The display elements can be any display indicia used to convey information to a user including, but not limited to, static indicia 18, dynamic lighted elements 20 and combinations thereof. Static indicia 18 can be any visual symbol formed on or in the housing 10 including, but not limited to, printed or engraved symbols, logos, letters, numbers and pictures. Dynamic lighted elements 20 can include, but is not limited to, light-emitting diodes (LED), liquid crystal displays (LCD), organic light-emitting diodes (OLED) and combinations thereof.

The second portion 27 of the HMI 24 is associated with the closure element 12 and includes an electrically conductive layer 22. When the closure element 12 is in the closed position, the electrically conductive layer 22 is arranged to be in register with the corresponding display elements of the first portion 25 located on the housing 10 including the static indicia 18 and dynamic lighted elements 20. The registration of the electrically conductive layer 22 to the static indicia 18 and dynamic lighted elements 20 can include any configuration to enable the association of the touch input of the electrically conductive layer 22 and the sensory output of the static indicia 18 and dynamic lighted elements 20 including but not limited to a mechanical vertical alignment of the input and output elements, a mechanical non-vertical alignment of the input and output elements that accounts for parallax, a software-driven alignment of dynamic lighted elements 20 and combinations thereof.

The electrically conductive layer 22 is a transparent layer that is thin relative to the thickness of the closure element 12. The electrically conductive layer 22 can respond to a touch event, for example, by registering a change in capacitance correlating to a distortion of an electrostatic field. The electrically conductive layer 22 can be formed of any transparent touch sensitive material including, but not limited to, transparent conductive coatings of indium tin-oxide (ITO), Poly(3,4-ethylenedioxythiophene) (PEDOT), poly(3,4-ethylenedioxythiophene) polystyrene sulfonate (PEDOT:PSS), silver nanowire, graphene oxide and combinations thereof. The second portion 27 of the HMI 24 can include an encapsulation layer 26 that can encase the electrically conductive layer 22 to protect and support the electrically conductive layer 22.

While described in the context of providing a capacitive touch-sensitive area of the closure element, the touch-sensitive area of the second portion 27 of the HMI 24 is not limited to materials responsive to capacitance. The touch-sensitive area of the second portion 27 of the HMI 24 can include any electronics, films or other layers that can be formed from transparent materials that respond to touch. In this way, the touch-sensitive area of the closure element 12 can respond to touch based on any touch-sensitive technology including, but not limited to, surface acoustic wave, infrared, optical, acoustic pulse recognition, and dispersive signal technologies.

The second portion 27 of the HMI 24 is in communication with the controller 30 by a wiring harness 14. The wiring harness 14 is an assembly of wires and connectors that can transmit data and power between the second portion 27 of the HMI 24 (e.g. from the electrically conductive layer 22) and the controller 30. The wiring harness 14 can include any number of wires as needed to transmit data and power between the second portion 27 of the HMI 24 and the controller 30 including, but not limited to, a three-wire harness that includes a ground wire in addition to a power and a data wire. Similarly, the dynamic lighted elements 20 of the first portion 25 of the HMI 24 are in communication with the controller 30 by a wiring harness 32.

The controller 30 located within the housing 10 is operably coupled to the HMI 24. It is contemplated that the controller 30 is a microprocessor-based controller that implements control software and sends and receives one or more electrical signals including data and power to and from each of the first portion 25 and the second portion 27 of the HMI 24 to control the user experience. For example, the controller 30 can synchronize a touch input from the electrically conductive layer 22 to activate a dynamic lighted element 20 in register with the touched input.

The controller 30 can include a memory 31 and a central processing unit (CPU) 33. The memory 31 can be used for storing the control software that is executed by the CPU 33 in reading the touch inputs and indexing the touch inputs to the displayed outputs of the HMI 24 and any additional software. The memory 31 can also be used to store information, such as a database or table, and to store data received from one or more components of the household appliance 11 that can be communicably coupled with the controller 30. The database or table can be used to store the various operating parameters for the HMI 24, including factory default values for the operating parameters and any adjustments to them by the controller 30 or by user input.

The controller 30 can also be coupled with one or more sensors provided in one or more of the systems of the household appliance 11 to receive input from the sensors, which are known in the art and not shown for simplicity. Non-limiting examples of sensors that can be communicably coupled with the controller 30 include: a treating chamber temperature sensor, a moisture sensor, a weight sensor, a chemical sensor, a position sensor and a motor torque sensor, any of which can be used to determine one or more outputs to be displayed on the dynamic lighted elements 20 of the HMI 24.

As shown in FIG. 1, the movable closure element 12 is in the closed position. A user 28 can touch the outer surface of the movable closure element 12 to interface with the HMI 24 of the household appliance 11. That is, from the user's perspective, the first portion 25 of the HMI 24 including the display elements (i.e. the static indicia 18 and the dynamic lighted elements 20) of the HMI 24 and the second portion 27 of the HMI 24 including the touch sensitive elements (i.e. the electrically conductive layer 22) appear to be a single integral component similar to the touch interface of a tablet or smart phone.

Figure 2:
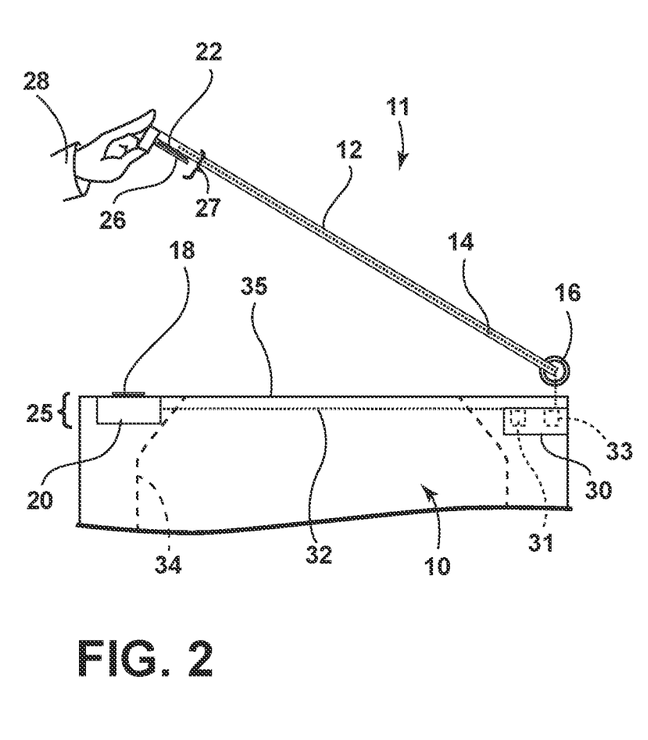
FIG. 2 shows a partial side view of a household appliance with a movable closure element in an opened position.

Referring now to FIG. 2, a partial side view of a household appliance 11 with a movable closure element 12 in an opened position is shown. Upon moving the movable closure element 12 to the opened position, the second portion 27 of the HMI 24 including the electrically conductive layer 22 physically separates from the first portion 25. None of the electronics associated with the lighted elements 20 travel with the closure element 12.

Figure 3:
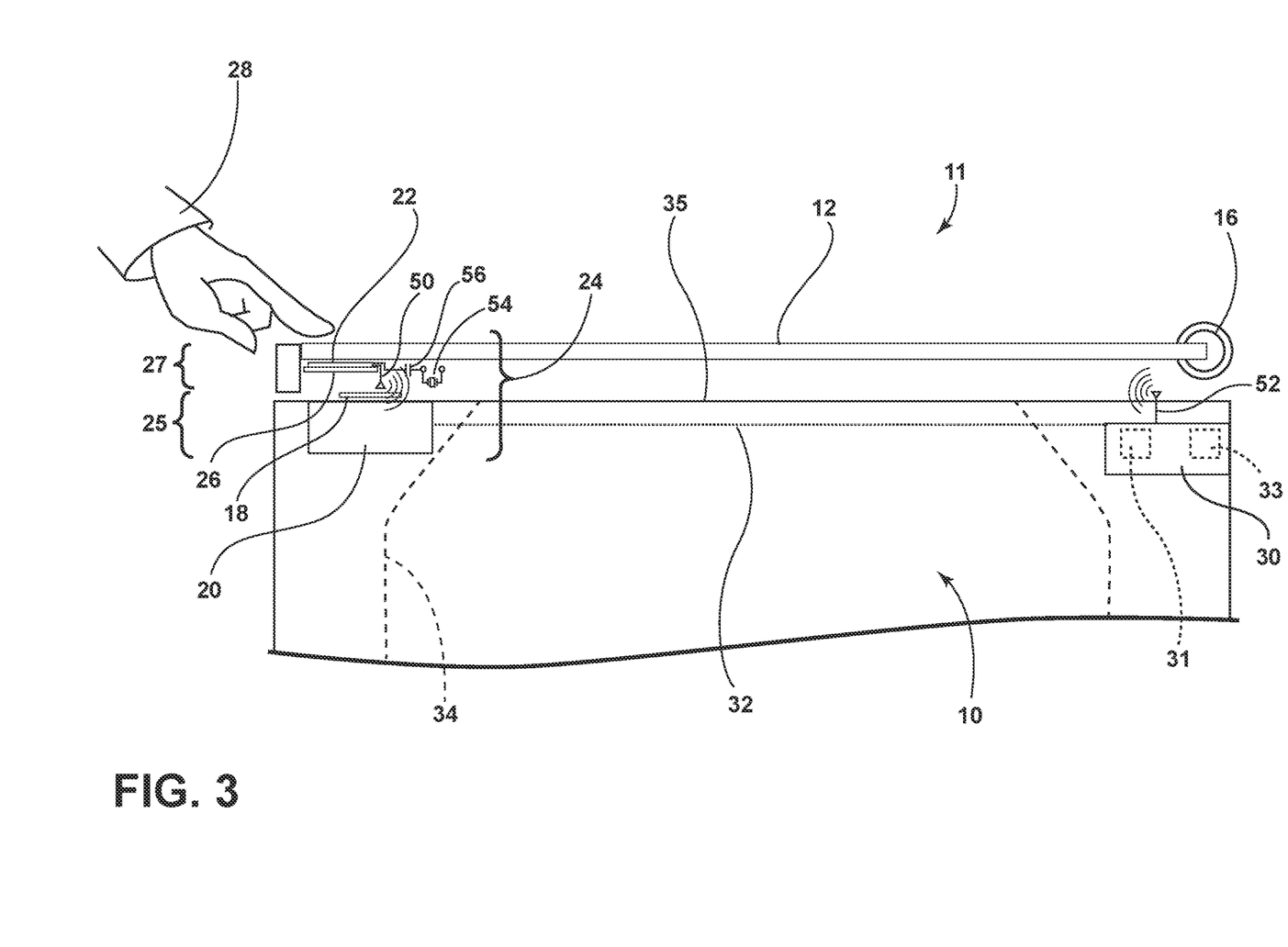
FIG. 3 shows a partial side view of a household appliance with a movable closure element in a closed position.

As described above, the second portion 27 of the HMI 24 communicates with the controller 30 to receive power and transmit data with a hard-wiring coupling via wire harness 14. The provision of a wired or cabled coupling could affect user interface performance due to the relatively long wire path of the wire harness 14. Additionally, the mechanical coupling of the wires harness 14 to the controller 30 could allow water ingress to the controller 30. Therefore, wireless communication alternatives for both data and power are contemplated. Referring now to FIG. 3, a partial side view of a household appliance 11 with a movable closure element 12 in a closed position is shown. The second portion 27 of the HMI 24 can include one or more of the following elements to be further described herein: an antenna 50 for data transmission or power reception, a capacitor 56 or battery to store electrical charge and an energy harvesting component 54 to capture energy incidental to the operation of the household appliance 11.

To wirelessly communicate data or power or both between the second portion 27 of the HMI 24 and the controller 30, the second portion 27 of the HMI 24 can include an antenna 50 and the controller 30 can include an antenna 52. In this way, the antenna 50 can transmit data related to touch events to the antenna 52 of the controller 30 and the antenna 52 of the controller 30 can transmit power to the antenna 50 of the second portion 27 of the HMI 24. While shown as a single antenna 50 for both power and data, the antennas 50 and 52 can each include any number of antennas to transmit power and data including but not limited to a single antenna for both power and data, a single antenna for power and a single antenna for data, and one or more antennas for transmission or reception of data. The antennas 50, 52 can be any type of antenna suited for placement in the household appliance including but not limited to dipole antennas and microstrip antennas.

The configuration and operation of the antennas 50, 52 can be any configuration that transmits power or data between the controller 30 and the second portion 27 of the HMI 24, including but not limited to, path, inverted-F, meander line and slot. In one example configuration, the antennas 50, 52 can be loop antennas and the second portion 27 of the HMI 24 the controller 30 can communicate by near-field communication (NFC) which uses magnetic induction between the two loop antennas located within each other's near field. The antennas 50, 52 can communicate data or power or both using any wireless standard suitable for data or power transmission including, but not limited to, Bluetooth (including Bluetooth Smart), Qi, Open Dots, Rezence and WiPower.

When the antenna 50 is not configured to receive electrical power from the antenna 52 of the controller 30, an energy harvesting component 54 can capture energy that can be converted to the electrical power needed by the second portion 27 of the HMI 24 for the operation of the touch sensitive input of the interface. The energy harvesting component 54 can include a piezoelectric element that converts mechanical strain into electric current or voltage. In this way, the second portion 27 of the HMI 24 can derive power from movement of the closure element 12 or vibration of the housing 10 induced by a cycle of operation such as can occur when the household appliance 11 is a laundry machine. Alternatively or in addition to a piezoelectric element, the energy harvesting component 54 can include any device configured to generate and provide a small amount of electrical power including, but not limited to, a pyroelectric element or thermoelectric generator that converts a temperature change into electric current or voltage and a rectenna that converts stray microwave energy into direct current electricity, etc. The decoupling of the lighting and display elements from the touch sensing aspects of the HMI 24 enable energy harvesting components and their relatively low power levels to be used as described.

The capacitor 56 or battery can store charge either received from the antenna 50 or the energy harvesting component 54, depending upon the implementation.

Figure 4:
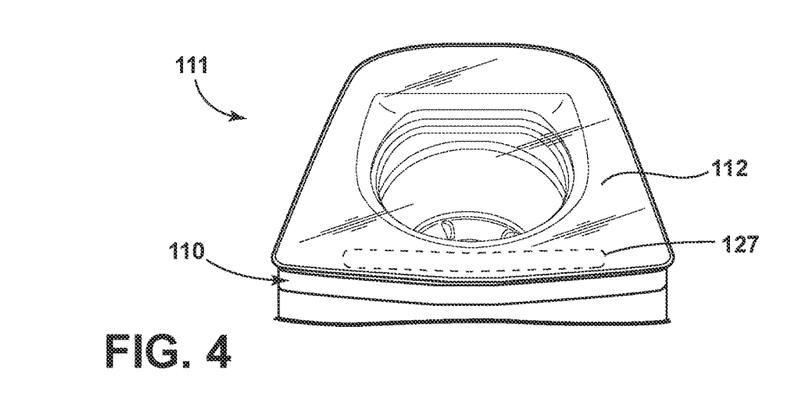
FIG. 4 shows a perspective view of a household laundry appliance with a transparent hinged lid in a closed position.

A number of aspects outlining the features of separating the touch and display portions of the HMI 24 of a household appliance 11 are demonstrated below by example of a household laundry appliance 111. FIG. 4 shows a perspective view of a household laundry appliance 111 where the movable closure element is a transparent hinged lid 112 in a closed position. The household laundry appliance 111 is similar to the more general household appliance 11 illustrated in FIGS. 1, 2 and 3; therefore, like parts will be identified with like numerals increased by 100, with it being understood that the description of the like parts of the household appliance 11 applies to the household laundry appliance 111, unless otherwise noted. When a user has not activated a touch event on the electrically conductive layer 122 for some predetermined period of time and there is no currently active cycle of operation, the HMI 124 can enter a "sleep mode" where the dynamic lighted elements 120 are all powered off. With the transparent hinged lid 112 in the closed position, the controller (not shown) can respond from "sleep mode" in the event of a user-initiated touch event. While the operation of a "sleep" mode and "waking" the HMI 24 is described below, the example is illustrative only and meant to demonstrate aspects of the HMI 24. The HMI 24 can include any operational modality to facilitate a desired user experience including but not limited to an operational state where the display elements are always on or selectively dimmable or synchronized to a cycle of operation, etc.

Figure 5:
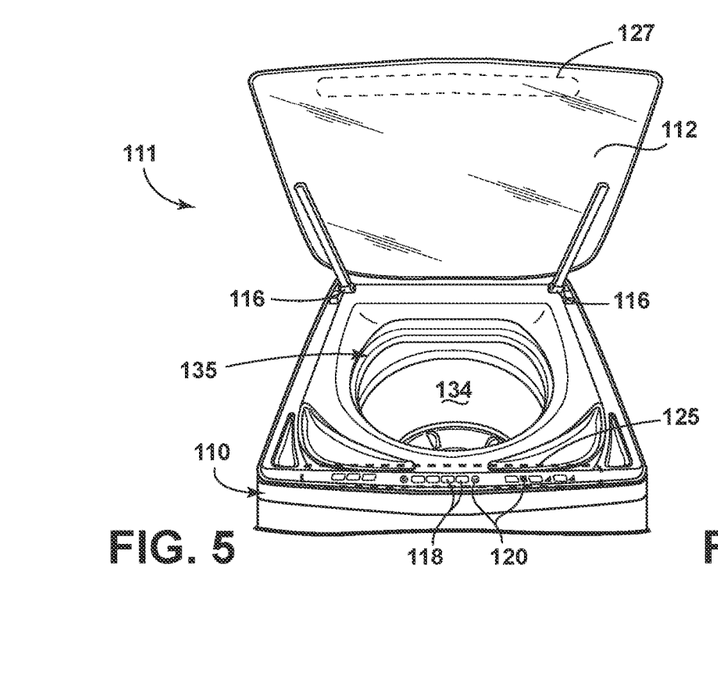
FIG. 5 shows a perspective view of a household laundry appliance with a transparent hinged lid in an opened position.

FIG. 5 shows a perspective view of the household laundry appliance 111 with the transparent hinged lid 112 in an opened position. Also in "sleep mode", with the transparent hinged lid 112 in the opened position, the controller (not shown) cannot respond from "sleep mode" in the event of a user-initiated touch event. Based on, for example, a trigger in the lid hinge 116 or a tilt sensor (not shown) coupled to the controller, the controller can configure the HMI 124 to not respond to any touch event sensed at the electrically conductive layer 122. It should be noted that a touch event when the transparent hinged lid 112 is in the opened position is both unlikely to occur and likely to be inadvertent in the event it does occur. However, explicitly ignoring a touch input when the movable closure element is in the open position is advantageous in other household appliances with different door or lid configurations.

Figure 6:
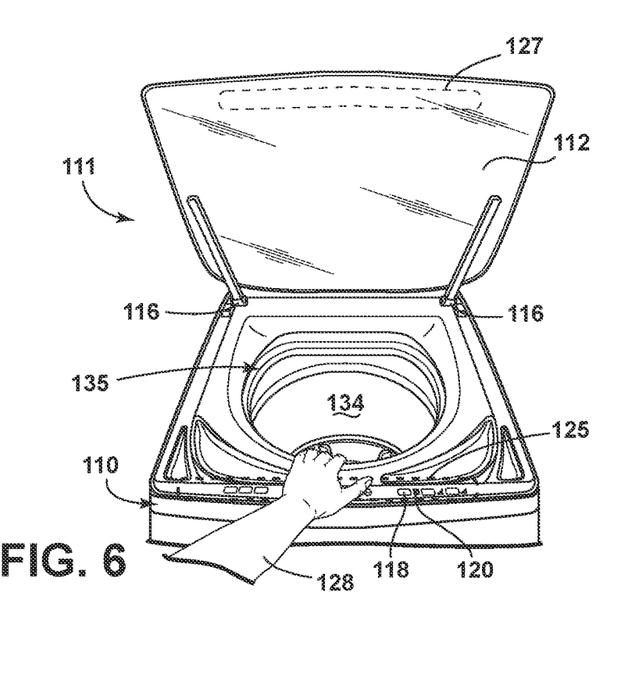
FIG. 6 shows a perspective view of a household laundry appliance with a transparent hinged lid in an opened position and a user accessing a treating chamber.

FIG. 6 shows a perspective view of a household laundry appliance 111 with a transparent hinged lid 112 in an opened position and a user 128 accessing a treating chamber 134. Because the lid 112 is in the opened position, the touch sensitive second portion 127 of the HMI is not in contact with the user 128 during a laundry load or unload operation. Therefore, the user 128 can contact any of the display elements 118, 120 of the first portion 125 of the HMI without inadvertently generating an input to the controller.

Figure 7:
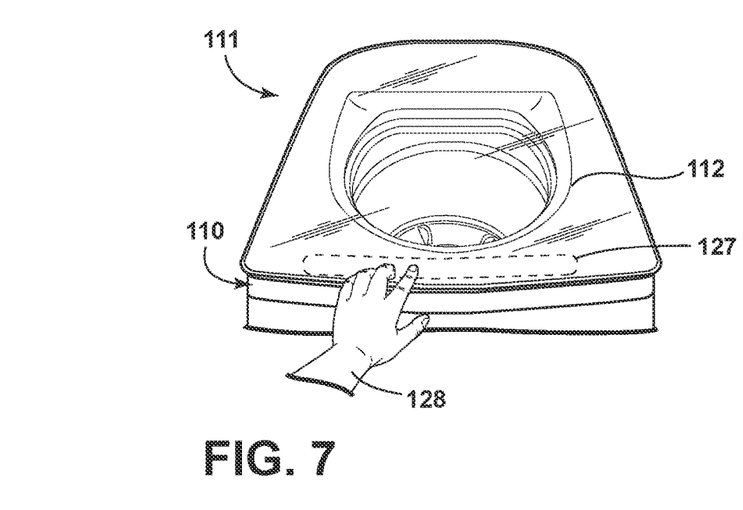
FIG. 7 shows a perspective view of a household laundry appliance with a transparent hinged lid in a closed position and a user touching an activation zone of the lid.
Figure 8:
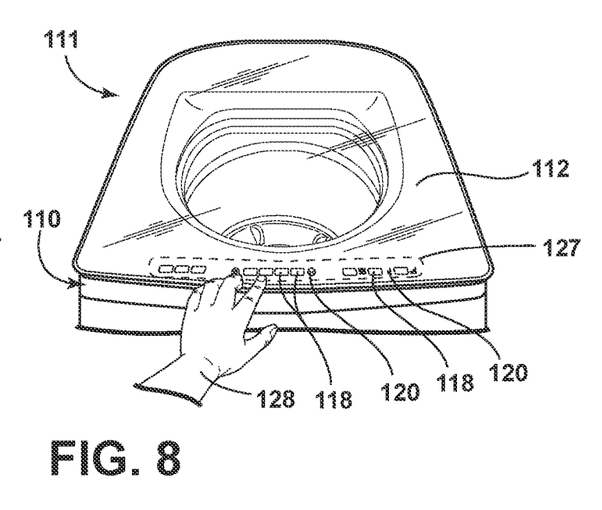
FIG. 8 shows a perspective view of a household laundry appliance with a transparent hinged lid in a closed position and a user touching an activation zone of the lid.
Figure 9:
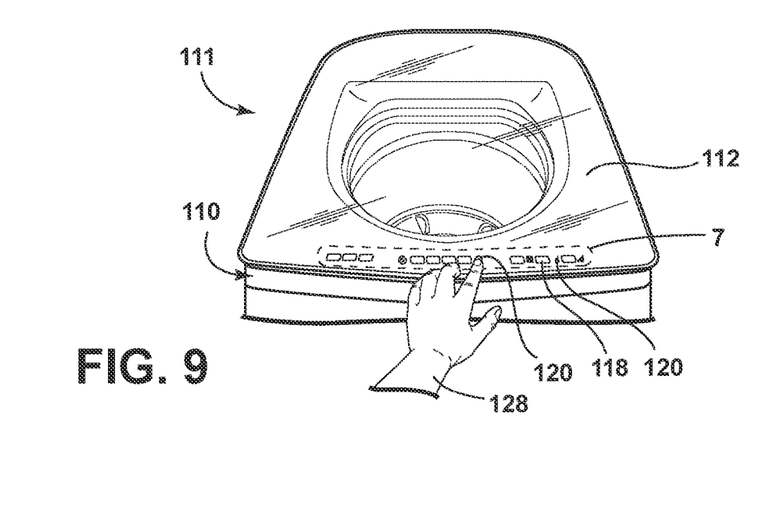
FIG. 9 shows a perspective view of a household laundry appliance with a transparent hinged lid in a closed position and a user touching an activation zone of the lid.

FIG. 7 shows a perspective view of a household laundry appliance 111 with a transparent hinged lid 112 in a closed position and a user 128 touching the second portion 127 of the HMI on the lid 112. To "wake" the HMI, a user 128 can initiate a touch event by contacting the second portion 127 of the HMI. Upon determining a touch activation as shown in FIG. 8, the controller can control the dynamic lighted elements 120 to provide light such that the user 128 can see the user display elements including the static indicia 118. At least one of the controls can include a touch event that will execute a cycle of operation. As shown in FIG. 9, a user 128 can make a selection by touching an appropriate area of the second portion 127 of the HMI that, via the controller, indexes to a cycle start indicia on the display of the interface. The user can enter different types of information including, without limitation, cycle selection, current cycle status, or current cycle state, and cycle parameters, such as cycle options.

Figure 10:
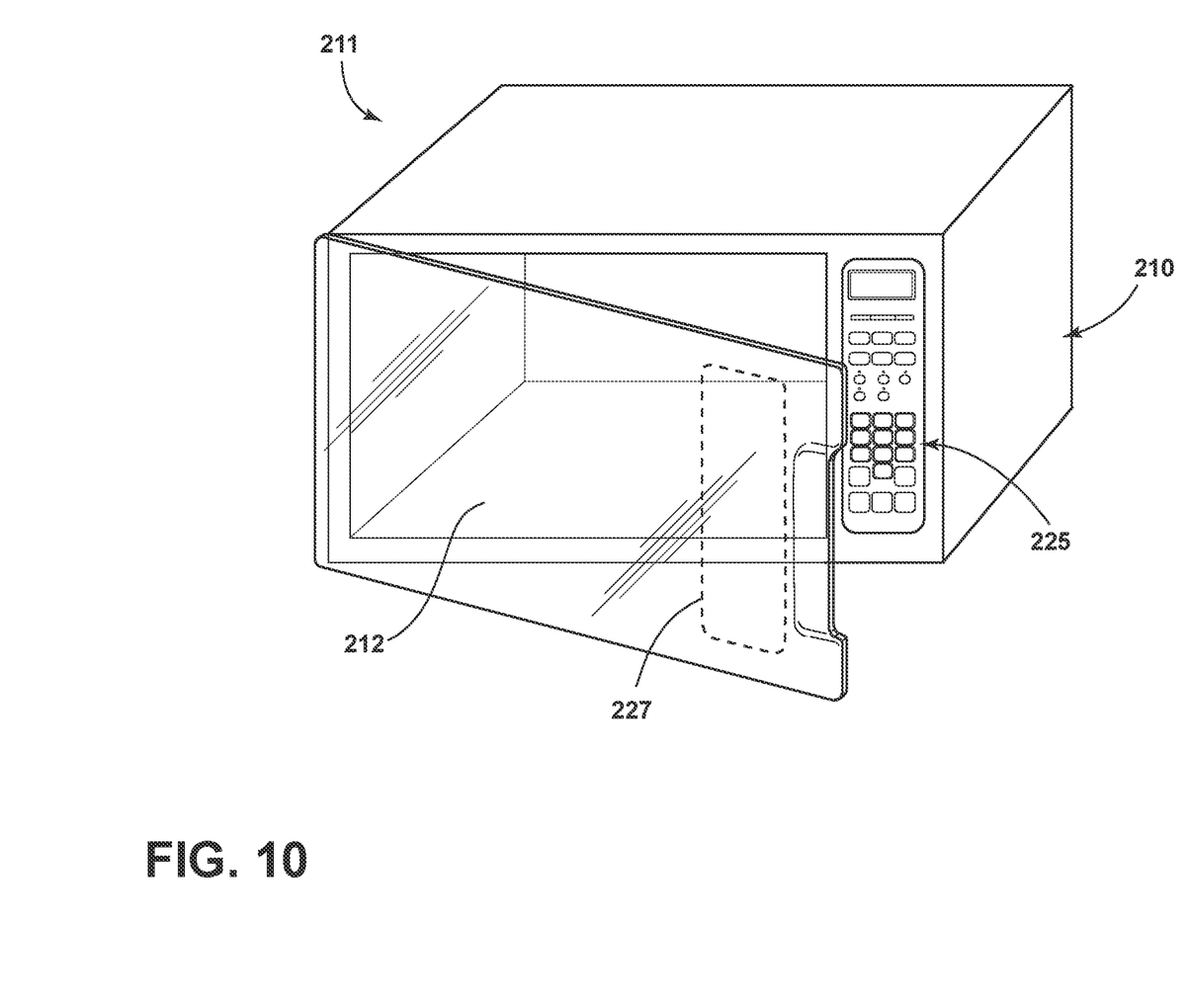
FIG. 10 shows a perspective view of a household cooking appliance with a transparent hinged door in an opened position.

While described above in the context of a household laundry appliance with a clear glass lid, the household appliance can be any appliance with a movable closure element and touch interface. FIG. 10 shows a perspective view of a household cooking appliance in the form of a microwave oven 211 with a transparent hinged door 212 in an opened position that includes the first portion 227 of the HMI responsive to touch input. The second portion 225 of the HMI included in the housing 210 that includes the display elements can be configured in an appearance typical to a conventional microwave oven.

Figure 11:
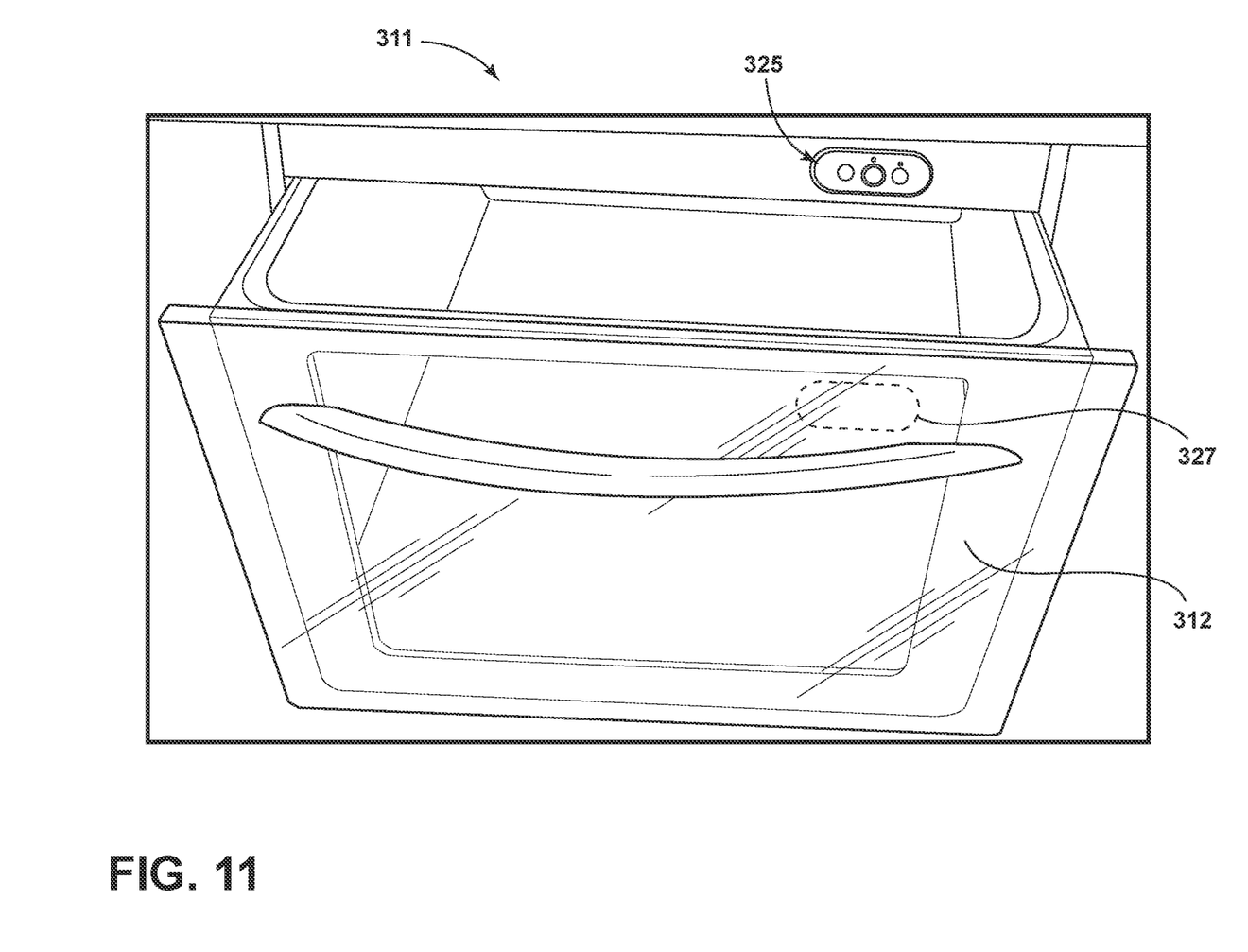
FIG. 11 shows a perspective view of a household dishwashing appliance with a transparent hinged door in an opened position.

FIG. 11 shows a perspective view of a household dishwashing appliance 311 with a transparent sliding door 312 in an opened position that includes the first portion 327 of the HMI responsive to touch input. The second portion 325 of the HMI included in the housing 310 can include display elements configured to select and modify cycles of operation conventional to a dishwasher and include displaying lighting cues to a user regarding the status of a cycle of operation.

Figure 12:
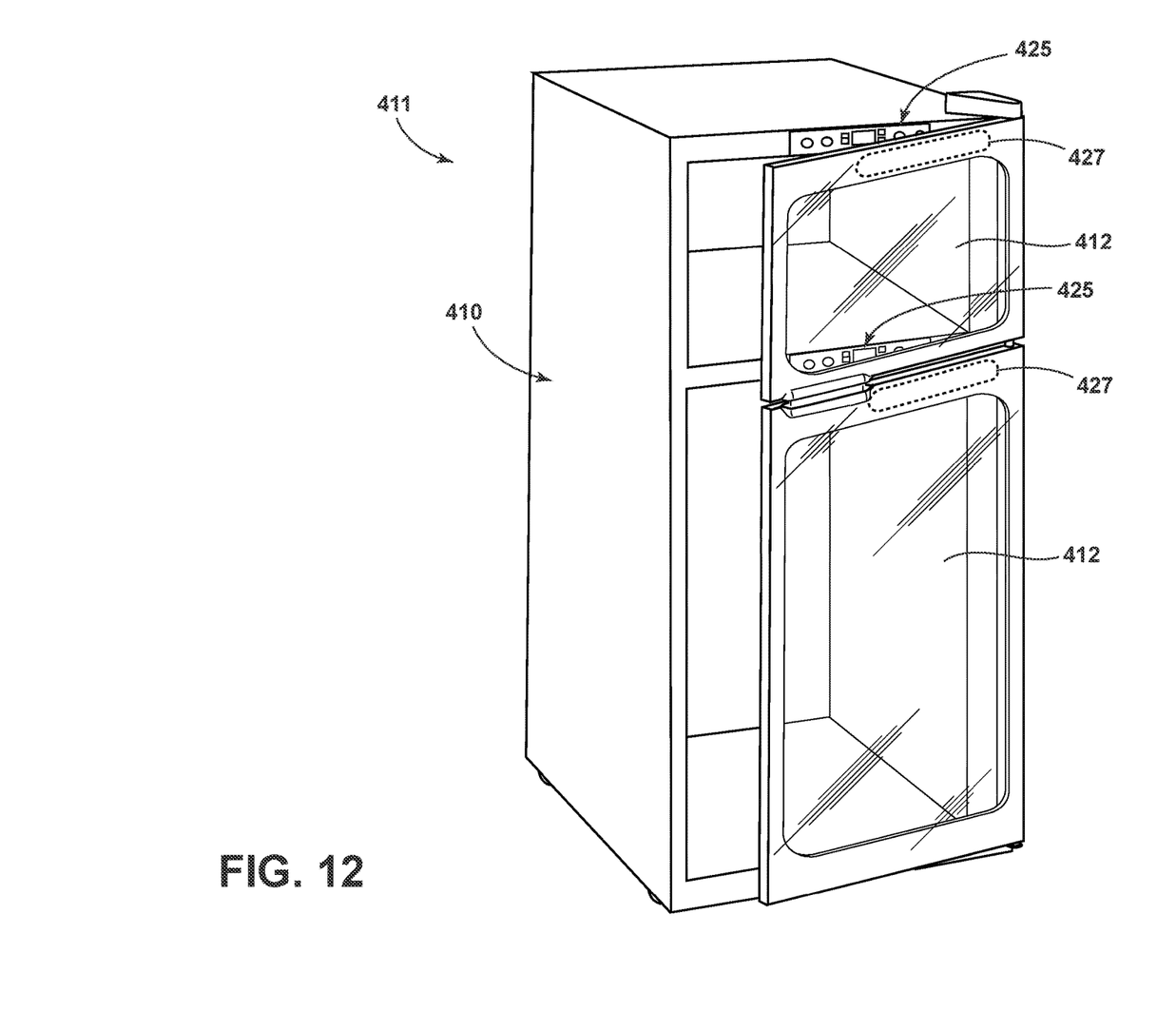
FIG. 12 shows a perspective view of a household refrigeration appliance with a transparent sliding door in an opened position.

FIG. 12 shows a perspective view of a household refrigeration appliance 411 with two transparent hinged doors 412 in an opened position. The first portion 427 of the HMI responds to touch input and is shown at a top edge of the doors 412 though it is contemplated that any edge of the door 412 can be used. The second portion 425 of the HMI included in the housing 410 can include display elements configured to select and modify refrigeration cycles and include displaying lighting cues to a user regarding the temperature of the treating chamber.

Benefits of the present disclosure include a touch-sensitive door, lid etc. that is the same across different models. That is, the display aspect of the HMI can change for new models and still be compatible with the same touch-sensitive door, lid, etc. Another benefit relates to the robustness of the touch-sensitive door or lid by separating the display electronics from the touch electronics. That is, many of the limitations related to the layout of the electrical traces are eliminated because the electrical routes needed for the touch electronics do not share space with the physically separated LCD and LED-based electronics. Another benefit includes the inadvertent touch mitigation feature inherent in locating the touch-sensitive electronics on a movable door, lid, drawer, etc.

Another benefit relates to the aesthetics of providing a touch-sensitive transparent door, lid or drawer, etc. Previous efforts to place touch sensitive electronics on an appliance door have included placement of display electronics on the door. These electronics do not have a visually appealing look and consequently the appliance door would need to be made opaque at least in the location of the electronics.

A consumer article is an object external to the household appliance that can be consumed, refreshed, preserved or otherwise used during operation of the household appliance or following operation of the household appliance. Examples of consumer articles include, but are not limited to, detergents and other wash aids for a household laundry appliance or dishwasher, fabric items (e.g., clothing), tableware, heat and serve meals, frozen side dishes, frozen meals and microwave popcorn.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method of operating a household appliance, the method comprising:
controllably displaying at least a portion of a human-machine interface, the human-machine interface having a first portion associated with a housing of the household appliance and a second portion associated with a closure element of the household appliance, the first portion having non-touch sensitive display elements, and the second portion having an electrically conductive layer having a touch-sensitive area, wherein the electrically conductive layer is arranged to be in register and associated with corresponding non-touch sensitive display elements when the closure element is in a closed position, and wherein the electrically conductive layer is not in register with corresponding non-touch sensitive display elements when the closure element is in an opened position, the human-machine interface adapted to receive a user input on the touch-sensitive area indicative of a selection of the non-touch sensitive display elements and implement a treating cycle based thereon, and wherein the controllably displaying comprises selectively displaying the non-touch sensitive display elements.

2. The method of claim 1, further comprising receiving a user input on the touch-sensitive area indicative of the selection of the non-touch sensitive display elements, providing the user input from the touch-sensitive area to a controller, and implementing a treating cycle on at least one item in a treating chamber by the controller, based on the provided user input.

3. The method of claim 1, further comprising determining, by a controller, a position of the closure element.

4. The method of claim 3 wherein the controller ignores any touch event on the touch-sensitive area when the closure element is determined to be in the opened position.

5. The method of claim 1 wherein the controllably displaying the non-touch sensitive display elements includes a controller selectively energizing a lighting element proximate to the non-touch sensitive display elements, wherein the selectively energizing of the lighting element enables the non-touch sensitive display elements to be visible through the second portion.

6. The method of claim 5 wherein the closure element is at least one of a lid, a door, a drawer, or a removable panel.

7. The method of claim 6 wherein at least a portion of the second portion is at least partially transparent.

8. The method of claim 7 wherein at least a portion of the touch-sensitive area is at least partially transparent.

9. The method of claim 7 wherein at least one of the first portion or the second portion is configured such that the non-touch sensitive display elements are not viewable through the second portion when the lighting element is off, and such that the non-touch sensitive display elements are viewable through the second portion when the lighting element is on.

10. The method of claim 6 wherein the non-touch sensitive display elements can be configured to account for parallax.

11. The method of claim 6 wherein the non-touch sensitive display elements include static indicia.

12. The method of claim 5 wherein the controllably displaying the non-touch sensitive display elements is based on information received by the controller from at least one of a temperature sensor, a moisture sensor, a weight sensor, a chemical sensor, a position sensor, or a motor torque sensor.

13. The method of claim 1 wherein the controllably displaying comprises a controller selectively operating the non-touch sensitive display elements in one of a sleep mode and an awake mode.

14. The method of claim 13, further comprising determining, by the controller, a period of time since a user has activated a touch event on the electrically conductive layer when no cycle of operation is active.

15. The method of claim 14 wherein the controllably displaying comprises the controller powering off the non-touch sensitive display elements when a predetermined time period has been met.

16. The method of claim 1 wherein the non-touch sensitive display elements include dynamic lighted elements and wherein the controllably displaying comprises selectively dimming the dynamic lighted elements.

17. The method of claim 1 wherein the non-touch sensitive display elements include dynamic lighted elements and wherein the controllably displaying comprises synchronizing the dynamic lighted elements to a cycle of operation.

18. A method of operating a household appliance, the method comprising:

controllably displaying a human-machine interface (HMI) having a first portion associated with an exterior of a housing and wherein the controllably displaying comprises controllably displaying the first portion having non-touch sensitive display elements and wherein the human-machine interface further comprises a second portion associated with a closure element, the second portion having an electrically conductive layer having a touch-sensitive area, wherein the electrically conductive layer is arranged to be in register and aligned with corresponding non-touch sensitive display elements when the closure element is in a closed position, and wherein the electrically conductive layer is not in register and unaligned with corresponding non-touch sensitive display elements when the closure element is in an opened position;

receiving a user input on the touch-sensitive area indicative of a selection of the non-touch sensitive display elements;

providing the user input from the touch-sensitive area to a controller; and implementing a treating cycle based on the provided user input.

19. The method of claim 18, further comprising ignoring any touch event on the touch-sensitive area when the closure element is opened.

20. The method of claim 18 wherein the controllably displaying the non-touch sensitive display elements includes controllably energizing a lighting element proximate to the non-touch sensitive display elements, wherein the energizing of the lighting element enables the non-touch sensitive display elements to be visible through the second portion.

* * * * *